(12) United States Patent
Endoh et al.

(10) Patent No.: US 7,706,245 B2
(45) Date of Patent: Apr. 27, 2010

(54) HIGH DENSITY OPTICAL DISC HAVING SMALL TRACK PITCH

(75) Inventors: Sohmei Endoh, Miyagi (JP); Noriyuki Saito, Miyagi (JP); Takahiro Igari, Miyagi (JP); Takeshi Gouko, Miyagi (JP); Shinji Minegishi, Shizouka (JP); Eijiro Kikuno, Shizuoka (JP)

(73) Assignees: Sony Corporation, Tokyo (JP); Sony Disc and Digital Solutions, Inc., Tokyo (JP)

( * ) Notice: Subject to any disclaimer, the term of this patent is extended or adjusted under 35 U.S.C. 154(b) by 0 days.

(21) Appl. No.: 12/156,349

(22) Filed: May 30, 2008

(65) Prior Publication Data

US 2008/0310294 A1    Dec. 18, 2008

Related U.S. Application Data

(62) Division of application No. 11/495,427, filed on Jul. 28, 2006, now Pat. No. 7,529,175.

(30) Foreign Application Priority Data

Aug. 9, 2005     (JP) .............................. 2005-230408

(51) Int. Cl.
    *G11B 7/24*    (2006.01)
(52) U.S. Cl. .................................... 369/275.4
(58) Field of Classification Search ............. 369/275.4, 369/275.1, 275.3
    See application file for complete search history.

(56) References Cited

U.S. PATENT DOCUMENTS

| 7,522,510 B2* | 4/2009 | Miyazaki et al. ............ 369/125 |
| 7,548,505 B2* | 6/2009 | Endoh et al. ............. 369/275.4 |
| 2005/0220991 A1* | 10/2005 | Aoyama et al. ............. 427/128 |
| 2006/0093863 A1* | 5/2006 | Tsuchiya et al. ............ 428/827 |
| 2008/0206672 A1* | 8/2008 | Watanabe et al. ...... 430/270.11 |
| 2008/0247288 A1* | 10/2008 | Yin ......................... 369/53.17 |

FOREIGN PATENT DOCUMENTS

| JP | 2003-315988 | 11/2003 |
| JP | 2003-346390 | 12/2003 |

* cited by examiner

*Primary Examiner*—Tan X Dinh
(74) *Attorney, Agent, or Firm*—Robert J. Depke; Rockey, Depke & Lyons, LLC (57) ABSTRACT

A recording method whereby an inorganic resist made of an incomplete oxide of a transition metal is formed as a film onto a substrate and a latent image corresponding to pits is formed onto the inorganic resist by exposure. The exposure is performed by a laser beam whose intensity has been modulated by a pulse signal whose pulse height decreases in a rear portion in a length direction of the pit, thereby forming a format of a track pitch smaller than a recording beam diameter (track pitch/exposure beam diameter=0.333 to 0.833).

4 Claims, 10 Drawing Sheets

TABLE 1

| | EXPOSURE WAVELENGTH | TRACK PITCH | WOBBLE AMOUNT | EXPOSURE BEAM DIAMETER |
|---|---|---|---|---|
| Blu-ray Disc | 266nm | 320nm | ±10nm | 360nm |

Fig. 6

TABLE 2

| A | 1st[mv] | 2nd[mv] | 3rd[mv] | 4th[mv] | 5th[mv] | 6th[mv] | 7th[mv] |
|---|---|---|---|---|---|---|---|
| 2T | 1000 | | | | | | |
| 3T | 950 | 900 | | | | | |
| 4T | 950 | 900 | 900 | | | | |
| 5T | 950 | 900 | 900 | 900 | | | |
| 6T | 950 | 900 | 900 | 900 | 900 | | |
| 7T | 900 | 900 | 900 | 900 | 900 | 900 | |
| 8T | 900 | 900 | 900 | 900 | 900 | 900 | 900 |

*Fig. 7*

TABLE 3

| B | 1st[mv] | 2nd[mv] | 3rd[mv] | 4th[mv] | 5th[mv] | 6th[mv] | 7th[mv] |
|---|---|---|---|---|---|---|---|
| 2T | 1000 | | | | | | |
| 3T | 900 | 800 | | | | | |
| 4T | 900 | 800 | 800 | | | | |
| 5T | 900 | 800 | 800 | 800 | | | |
| 6T | 900 | 800 | 800 | 800 | 800 | | |
| 7T | 900 | 800 | 800 | 800 | 800 | 800 | |
| 8T | 900 | 800 | 800 | 800 | 800 | 800 | 800 |

Fig. 8

TABLE 4

| C  | 1st[mv] | 2nd[mv] | 3rd[mv] | 4th[mv] | 5th[mv] | 6th[mv] | 7th[mv] |
|----|---------|---------|---------|---------|---------|---------|---------|
| 2T | 1000    |         |         |         |         |         |         |
| 3T | 900     | 800     |         |         |         |         |         |
| 4T | 900     | 800     | 700     |         |         |         |         |
| 5T | 900     | 800     | 700     | 700     |         |         |         |
| 6T | 900     | 800     | 700     | 700     | 700     |         |         |
| 7T | 900     | 800     | 700     | 700     | 700     | 700     |         |
| 8T | 900     | 800     | 700     | 700     | 700     | 700     | 700     |

Fig. 9

TABLE 5

| DISC I | R START [mm] | R END [mm] | TRACK PITCH | PULSE STRATEGY | POWER | 8T WIDTH | 8T WIDTH Dev. | 2T WIDTH | 2T/8T WIDTH Dev. |
|---|---|---|---|---|---|---|---|---|---|
| AREA 1 | 20 | 21 | 160nm | A | 2.16mW | 40-90nm | 44.4% | 40nm | 61.5% |
| AREA 2 | 21 | 22 | 160nm | A | 2.30mW | 69-97nm | 71.1% | 52nm | 62.6% |
| AREA 3 | 22 | 23 | 160nm | A | 2.44mW | 86-120nm | 71.7% | 90nm | 87.3% |
| AREA 4 | 23 | 24 | 160nm | B | 2.23mW | 48-62nm | 77.4% | 34nm | 61.8% |
| AREA 5 | 24 | 25 | 160nm | B | 2.30mW | 66-73nm | 90.4% | 68nm | 97.8% |
| AREA 6 | 25 | 26 | 160nm | B | 2.44mW | 87-93nm | 93.5% | 90nm | 100.0% |
| AREA 7 | 26 | 27 | 160nm | C | 2.16mW | 44.5-69nm | 64.5% | 41nm | 72.2% |
| AREA 8 | 27 | 28 | 160nm | C | 2.30mW | 66-82nm | 80.5% | 66nm | 95.6% |
| AREA 9 | 28 | 29 | 160nm | C | 2.37mW | 78-90nm | 86.6% | 73nm | 86.9% |

*Fig. 10*

TABLE 6

| DISC II | R START [mm] | R END [mm] | TRACK PITCH | PULSE STRATEGY | POWER | 8T WIDTH | 8T WIDTH Dev. | 2T WIDTH | 2T/8T WIDTH Dev. |
|---|---|---|---|---|---|---|---|---|---|
| AREA 1 | 20 | 21 | 300nm | B | 2.25mW | 75-85nm | 88.2% | 71nm | 88.8% |
| AREA 2 | 21 | 22 | 300nm | B | 2.50mW | 95-103nm | 92.2% | 95nm | 96.0% |
| AREA 3 | 22 | 23 | 300nm | B | 2.70mW | 120-126nm | 95.2% | 122nm | 99.2% |
| AREA 4 | 23 | 24 | 200nm | B | 2.20mW | 70-86nm | 81.4% | 60nm | 76.9% |
| AREA 5 | 24 | 25 | 200nm | B | 2.40mW | 86-92nm | 93.5% | 87nm | 97.7% |
| AREA 6 | 25 | 26 | 200nm | B | 2.55mW | 96-102nm | 94.1% | 98nm | 99.0% |
| AREA 7 | 26 | 27 | 120nm | C | 2.10mW | 36-58nm | 62.1% | 35nm | 74.5% |
| AREA 8 | 27 | 28 | 120nm | C | 2.20mW | 49-61nm | 80.3% | 50nm | 89.3% |
| AREA 9 | 28 | 29 | 120nm | C | 2.30mW | 60-70nm | 85.7% | 61nm | 93.8% |

HIGH DENSITY OPTICAL DISC HAVING SMALL TRACK PITCH

CROSS-REFERENCES TO RELATED APPLICATIONS

The subject matter of application Ser. No. 11/495,427 is incorporated herein by reference. The present application is a divisional of U.S. application Ser. No. 11/495,427, filed Jul. 28, 2006, now U.S. Pat. No. 7,529,175 which claims priority to Japanese Patent Application JP 2005-230408 filed in the Japanese Patent Office on Aug. 9, 2005, the entire contents of which being incorporated herein by reference.

BACKGROUND OF THE INVENTION

1. Field of the Invention

The invention relates to a recording method which is applied to manufacturing of a master for an optical disk, the master for the optical disk, and an optical recording medium.

2. Description of the Related Arts

In recent years, a "Blu-ray Disc (registered trademark of Sony Corporation)," format has been proposed. The Blu-ray Disc (hereinbelow, properly referred to as a BD) format is a format of a high-density optical disk having a recording capacity of about 25 Gbytes for a one-side single-layer or about 50 Gbytes for a one-side double-layers.

Further, according to the BD format, in order to reduce a spot diameter of a laser beam for recording and reproduction, a wavelength of a light source is set to 405 nm and a numerical aperture NA of an objective lens is set to a large value of 0.85. In the BD format, since the spot diameter can be decreased to 0.58 μm, it can be decreased to about ⅕ of that of a DVD (Digital Versatile Disc). Further, since the numerical aperture NA of the objective lens has been increased, an angular error (called a tilt margin) which is permitted to an inclination of an angle between a disk surface and an optical axis of the laser beam from 90° decreases. Therefore, a cover layer covering an information layer is thinned to 0.1 mm.

In the case of an optical disk of the rewritable BD format, an on-groove recording is used. According to the on-groove recording, the recording is executed only to grooves in convex portions having a rough shape by what are called guide grooves formed on a disc substrate along recording tracks. Grooves in a data recording area are wobbled grooves formed by a multiplexed signal of an MSK (Minimum Shift Keying) signal and an STW (Saw Tooth Wobble) signal. The MSK system is a modulating system of the wobbles and addresses have concentratedly been embedded in a specific position of the wobbles formed by a sine wave.

By concentratedly embedding information as mentioned above, if there is a defect in such a portion, the information is influenced. Therefore, the STW is multiplexed to the wobbles of the MSK. The STW system is a system in which the wobble shape is set to a form of a saw-tooth wave and "0" and "1" of the address information are discriminated on the basis of the direction of the tooth. According to the STW system, since the same information is continuously arranged in a wide range, there is such a feature that even if a partial defect occurs, a possibility that it can be restored is high. In the case of the rewritable BD format, by combining the MSK and the STW, the address information having high survivability for the error can be obtained.

Since the optical disc substrate has generally been formed by an injection molding of a resin material, the low price of the optical disk has been realized. In the injection molding of the optical disc substrate, in order to provide patterns of grooves, pits, and the like for the optical disk, a stamper as a master for manufacturing the optical recording media onto which those patterns are transferred is arranged in a cavity of an injection molding apparatus.

An outline of a manufacturing method of the stamper will now be described. First, a glass master is coated with a very thin photoresist (sensitive material) by a spin coating method or the like and the disc is exposed by a laser of a cutting apparatus while rotating the glass master. A latent image of the patterns corresponding to the grooves or pits is formed onto the photoresist film by the exposure.

After that, by dropping a developer onto the rotating glass master and executing a developing process, the concave/convex resist patterns corresponding to the grooves or pits of the optical disk are formed onto the glass master.

Subsequently, a metal such as nickel or the like is precipitated onto the glass master by a plating process, peeled off, and trimmed, so that the stamper is obtained. The stamper is arranged in the cavity of the injection molding apparatus. By injecting the resin into the cavity, the disc substrate is formed.

Figure 5:
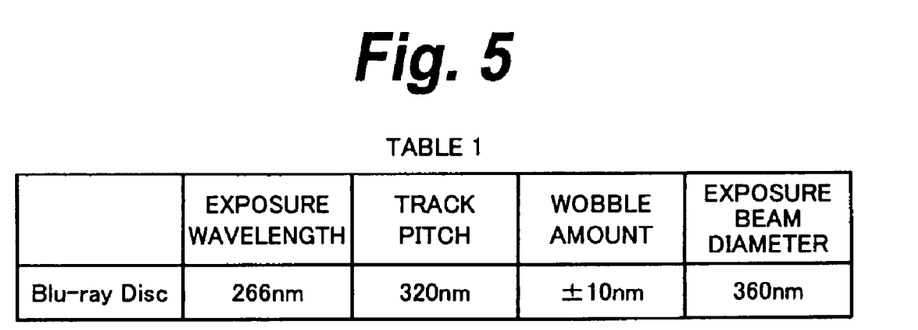
FIG. 5 is Table 1 showing an exposure wavelength of a laser, a track pitch, a wobble amount, and an exposure beam diameter in a ED format.

An exposure beam diameter d at the time of exposing the photoresist film is expressed by the following equation (1).

$$d = 1.22 \times \lambda / NA \qquad (1)$$

where, $\lambda$: wavelength of the light source (laser) for exposure which is used NA: numerical aperture of the objective lens for converging a light flux emitted from the light source onto the sensitive material Table 1 (refer to FIG. 5) shows the exposure wavelength of the laser, a track pitch, a wobble amount, and the exposure beam diameter in the BD format.

As shown in Table 1, in the BD of the high-density optical disk, a deep ultraviolet laser (wavelength: 266 nm) and a resist of a stable novolak system are used, thereby enabling a format of a track pitch smaller than a diameter of the recording beam to be formed. That is, even in the case of using a stable laser of 266 nm in which a track pitch of the data recording area is equal to 320 nm and a wavelength is short, the following relation is obtained.

Exposure beam diameter(about 360 nm)>track pitch (320 nm)

From the above relation, the exposure beam leaks to the adjacent track. A technique in which even if the track pitch is narrowed, by uniforming an overlap of the exposure beams, fluctuations of a pit size and a pit shape are suppressed and a jitter and crosstalks of the high-density optical disk are reduced has been disclosed in Patent Document 1 (JP-A-2003-346390).

However, in the case of the optical disk of the rewritable BD format, there is a case where the wobbled grooves extremely approach each other in dependence on a phase relation between the adjacent wobbled grooves, and an amount of leakage of the exposure beam to the adjacent track changes. In addition, since an amount of leakage of the exposure beam to a land portion further changes by the wobbles, a height of land portion changes in the BD disc formed by the steps of the exposure, development, forming and molding of the stamper, and the like.

In the rewritable BD format, since a phase-change recording film is used, a depth of groove is so shallow to be about 23 nm and in the data recording portion, when a change amount of the height of land portion due to the wobbles is equal to or larger than 1.4 nm, an influence of the height change amount increases. Thus, a fluctuation amount of a push-pull signal is large, secondary distortions of the MSK and the STW wobbles are large, and it is difficult to satisfy the standard.

A technique which can solve the problem in the case of using the organic resist in the related art and enables the high-density optical disk to be manufactured has been disclosed in Patent Document 2 (JP-A-2003-315988). There has been disclosed such a technique that in an inorganic resist material made of an incomplete oxide of a transition metal disclosed in Patent Document 2, even by the exposure using a visible laser of about 405 nm, the exposure of patterns smaller than the spot diameter can be performed showing to the thermal recording characteristics. An attention has been paid to such a technique as a technique that is useful to a mastering technique of the optical disk corresponding to the BD format of a ROM (Read Only Memory) or the recording density higher than that in the BD format.

The incomplete oxide of the transition metal disclosed here denotes a compound in which an oxygen content is deviated in such a direction as to be smaller than that of a stoichiometric composition according to a valence number which the transition metal can have, that is, a compound in which the content of oxygen in the incomplete oxide of the transition metal is smaller than the oxygen content of the stoichiometric composition according to the valence number which the transition metal can have. In the incomplete oxide of the transition metal, since a latent image forming portion by the exposure has been oxide-altered, it is soluble to an alkali developer and microfabrication of the master for the optical disk can be realized.

The exposure beam diameter d in the case of the laser wavelength of 406 nm is obtained by $$d=1.22\times406\ [nm]/0.85=\text{about 583 [nm]}$$

The following relation is obtained.

Exposure beam diameter(583 nm)>>track pitch (320 nm)in the BD format of the ROM

As mentioned above, by using the inorganic resist, the optical disk format of the track pitch which is equal to about the half of the exposure beam diameter can be formed.

Figure 4:
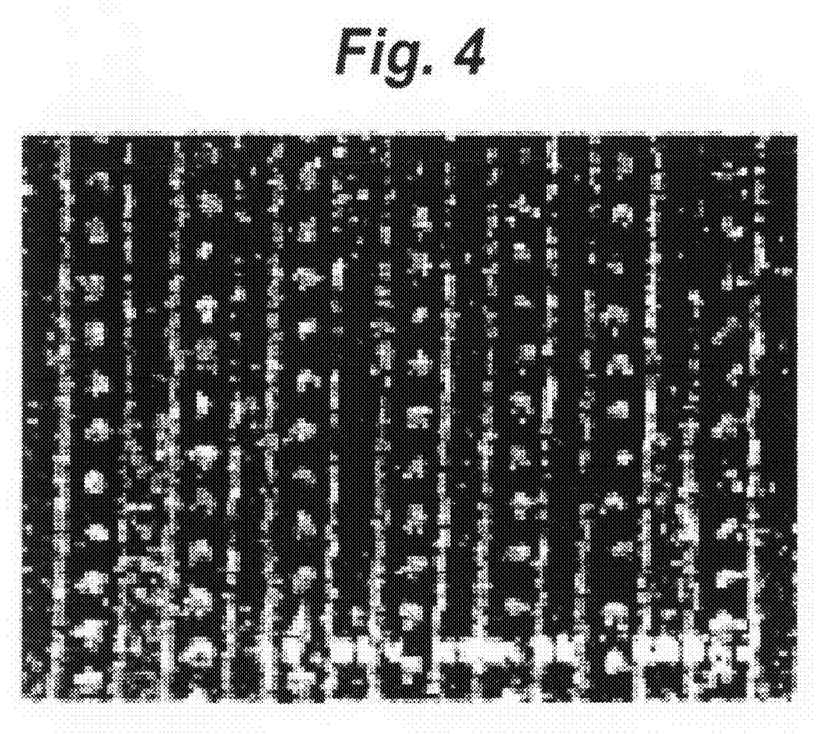
FIG. 4 is a brightness diagram showing a result when concave/convex marks are observed by an SEM.

A technique in which by using a phase-change (inorganic) resist and a laser of the wavelength of 480 nm, super-high density concave/convex marks each having a diameter of about 40 nm as shown in an SEM (Scanning Electron Microscope) photograph in FIG. 4 can be formed has been disclosed in Non-Patent Document 1 (Nano-pattern machining technique of a phase-change recording film for a disk, "HAI-TAKKU", Hitachi, Ltd., pages 9-10, April, 2004).

SUMMARY OF THE INVENTION

However, to form the super-high density optical disk format, it is necessary to form a format in which a fluctuation (that is, deviation) in the groove width is small, a variation of the track pitch is small, and a height change of the land portion is small. In Non-Patent Document 1 mentioned above, the super-high density ROM in which each of a pit length and a space length are equal to 40 nm has been made on an experimental basis by using the phase-change (inorganic) resist and the laser of the wavelength of 480 nm. However, as will be understood from FIG. 4, since the widths and lengths of the pits are not uniform and the variation in the track pitch is large, such a disk does not satisfy the sufficient characteristics as an optical disk format. The modulation such as 1-7 modulation or the like is not executed and the ROM format of the optical disk is not realized.

Even if the disk is directly exposed by a pulse signal of the 1-7 modulation by using the inorganic resist, there is such a problem that the pit width is changed in dependence on the pit length, a heat is accumulated in a rear portion of the exposure beam, there is a change in width in one pit, or the like.

As mentioned above, if the ROM format of the super-high density optical disk whose track pitch is equal to or less than 300 nm is formed, this means that the fluctuation in the pit width due to the pit length is small, the width change in one pit is small, and the track pitch variation is also small. It is, therefore, very difficult to realize such a format by the related art.

Upon manufacturing of another device such as a semiconductor or the like without limiting to the optical disk, it is also difficult to form the accurate and extremely fine concave and convex portions in which the height change is small.

It is, therefore, desirable to provide a recording method, a master for an optical disk, and an optical recording medium which are suitable when they are applied to a high-density optical disk whose track pitch is equal to or less than 300 nm and in which recording and reproducing characteristics such as tracking servo characteristics and the like are excellent and the high density can be practically realized.

According to an embodiment of the present invention, there is provided a recording method whereby an inorganic resist made of an incomplete oxide of a transition metal is formed as a film onto a substrate and a latent image corresponding to pits is formed onto the inorganic resist by exposure, wherein the exposure is performed by a laser beam whose intensity has been modulated by a pulse signal whose pulse height decreases in a rear portion in a length direction of the pit, thereby forming a format of a track pitch smaller than a recording beam diameter (track pitch/exposure beam diameter=0.333 to 0.833).

According to another embodiment of the present invention, there is provided a recording method whereby an inorganic resist made of an incomplete oxide of a transition metal is formed as a film onto a substrate and a latent image corresponding to pits is formed onto the inorganic resist by exposure, comprising the steps of:

feedback controlling an intensity of a laser beam so that a change amount of an exposure amount is equal to or less than ±1.0%;

performing the exposure by the laser beam whose intensity has been modulated by a pulse signal whose pulse height decreases in a rear portion in a length direction of the pit; and forming a format of a track pitch smaller than a recording beam diameter (track pitch/exposure beam diameter=0.333 to 0.833) by using a high-precision track feeding servo whose track pitch variation is equal to or less than ±3 nm.

According to still another embodiment of the present invention, there is provided a master for an optical disk having a format in which a track pitch is equal to 300 to 120 nm, wherein a width change of a pit having a maximum length among a plurality of pit lengths is equal to or less than 80.3 W.

According to still another embodiment of the present invention, there is provided a master for an optical disk having a format in which a track pitch is equal to 300 to 120 nm, wherein a fluctuation of a pit width due to a pit length is equal to or less than 89.3%.

According to still another embodiment of the present invention, there is provided a master for an optical disk having a format in which a track pitch is equal to 300 to 120 nm, wherein a track pitch variation is equal to or less than ±3 nm.

According to still another embodiment of the present invention, there is provided an optical recording medium having a format in which a track pitch is equal to 300 to 120 nm, wherein a width change of a pit having a maximum length among a plurality of pit lengths is equal to or less than 80.3%.

According to still another embodiment of the present invention, there is provided an optical recording medium having a format in which a track pitch is equal to 300 to 120 nm, wherein a fluctuation of a pit width due to a pit length is equal to or less than 89.3%.

According to still another embodiment of the present invention, there is provided an optical recording medium having a format in which a track pitch is equal to 300 to 120 nm, wherein a track pitch variation is equal to or less than ±3 nm.

According to an embodiment of the present invention, the super-high density optical recording medium whose track pitch is equal to or less than 300 nm can be realized.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

Figure 1:
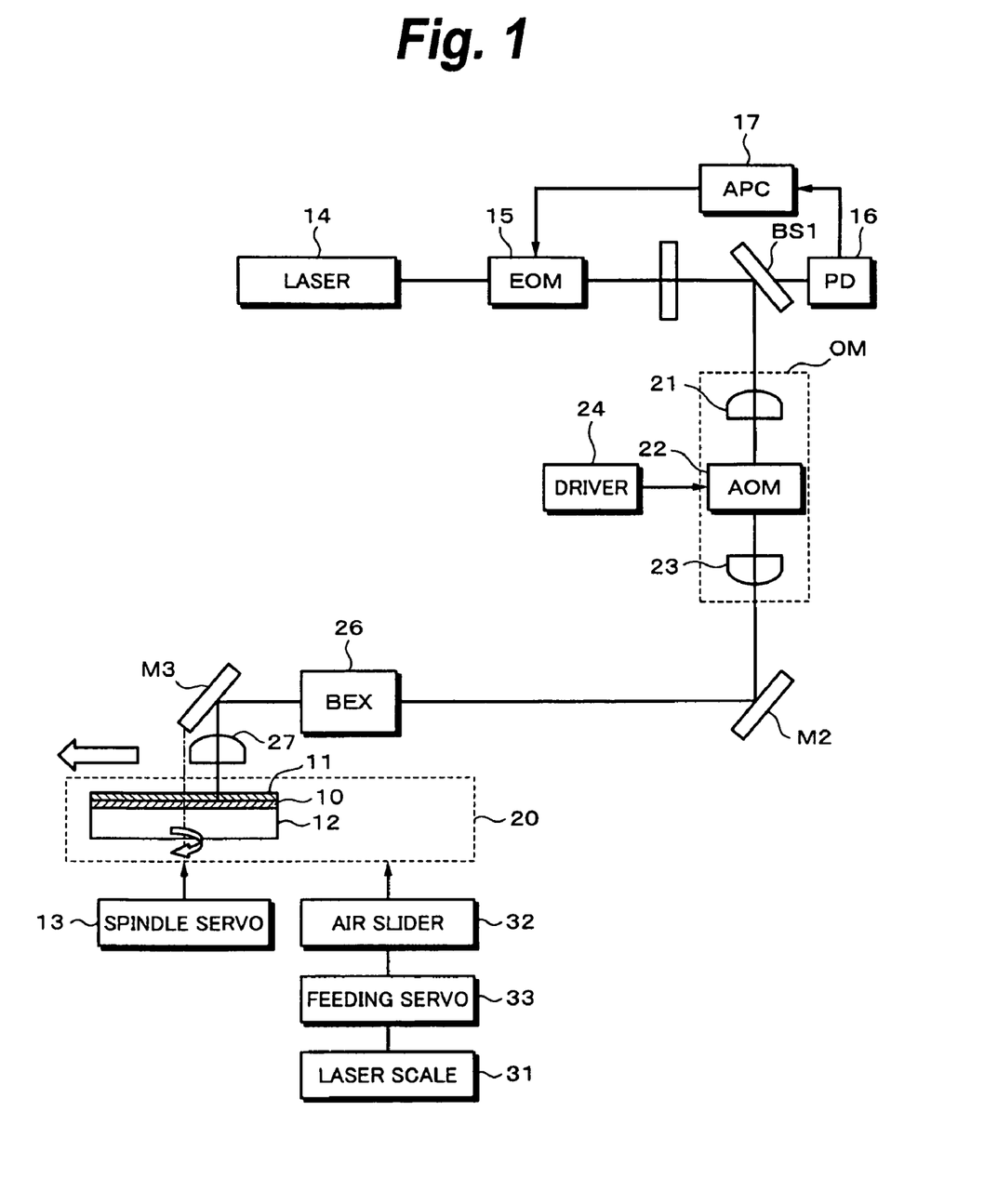
FIG. 1 is a schematic diagram showing an example of an optical recording apparatus to which an embodiment of the invention can be applied.

An embodiment of the invention will be described hereinbelow with reference to the drawings. The embodiment provides a method of forming a proper pit shape in a super-high density optical disk medium of a ROM. FIG. 1 shows a high-precision laser exposing apparatus in the embodiment of the invention.

In the embodiment, the high-precision exposure is enabled mainly by the following component elements.

1) A laser light source of quartic harmonics of a YAG (Yttrium Aluminum Garnet) laser having a wavelength of 266 nm and an objective lens having a numerical aperture NA=0.9 are used and an exposure beam is reduced.

2) High-precision light output control is made and a change amount of an exposure amount is set to a value within ±1.0%. Further, by performing exposure by a pulse strategy whose pulse height decreases in a rear portion, a fluctuation of a pit width due to a pit length is reduced and a width change in one pit is reduced.

3) A laser scale of super-high resolution (0.28 nm) is used for a high-precision track feeding servo, a slide motor drive of a linear amplifier is used (high gain of about tens of kHz), and a track pitch variation is set to a value within ±3 nm.

An inorganic resist of super-high resolution is used as a resist material, thereby realizing a super-high density optical disk format in which a fluctuation of a groove width is small, a track pitch variation is also small, a height change of a land portion is small, and a track pitch is equal to or less than 300 nm.

A resist material which is used in the embodiment is an incomplete oxide of a transition metal. It is now defined that the incomplete oxide of the transition metal is a compound in which an oxygen content is deviated in such a direction as to be smaller than that of a stoichiometric composition according to a valence number which the transition metal can have, that is, a compound in which the content of oxygen in the incomplete oxide of the transition metal is smaller than the oxygen content of the stoichiometric composition according to the valence number which the transition metal can have.

For example, the case where an oxide shown by a chemical formula $MoO_3$ is used as an oxide of the transition metal will be described as an example. When an oxide state of the chemical formula $MoO_3$ is converted into a composition ratio $Mo_{1-x}O_x$, it will be understood that the oxide in the case where x=0.75 is a complete oxide and the oxide in the case where $0 \leq x \leq 0.75$ is the incomplete oxide whose oxygen content lacks more than that of the stoichiometric composition.

In the transition metals, there are metals in which one element can form the oxide of a different valence number. In such a case, it is assumed that the case where the actual oxygen content lacks more than that of the stoichiometric composition according to the valence number which the transition metal can have lies within the range in the embodiment. For example, as for Mo, the tervalent oxide ($MoO_3$) mentioned above is most stable. Another univalent oxide (MoO) also exists. In this case, when it is converted into the composition ratio $Mo_{1-x}O_x$, it will be understood that the oxide in the case where $0 \leq x \leq 0.5$ is the incomplete oxide whose oxygen content lacks more than that of the stoichiometric composition. The valence number of the transition metal oxide can be analyzed by a commercially available analyzer.

Such an incomplete oxide of the transition metal exhibits absorbing characteristics to the ultraviolet rays or the visible light and by irradiating the ultraviolet rays or the visible light to the incomplete oxide, its chemical nature is changed. Thus, as will be explained in detail hereinafter, although it is the inorganic resist, a difference between an etching speed of an exposing portion and that in a non-exposing portion occurs in the developing step, that is, what is called a selection ratio is obtained. In the resist material made of the incomplete oxide of the transition metal, since a film particle size is small, the patterns in a boundary portion between the non-exposing portion and the exposing portion become clear and resolution can be raised.

In the incomplete oxide of the transition metal, since the characteristics as a resist material are changed in dependence on a degree of oxidization, a proper optimum oxidization degree is selected. For example, in the incomplete oxide whose oxygen content is fairly smaller than that of a stoichiometric composition of a complete oxide of the transition metal, there is such an inconvenience that a large irradiating power is necessary in the exposing step, it takes a long time for the developing process, and the like. Therefore, it is preferable to use the incomplete oxide whose oxygen content is slightly smaller than that of the stoichiometric composition of the complete oxide of the transition metal.

AS specific transition metals forming the resist material, Ti, V, Cr, Mn, Fe, Nb, Cu, Ni, Co, Mo, Ta, W, Zr, Ru, Ag, and the like can be mentioned. Among them, it is preferable to use Mo, W, Cr, Fe, and Nb. It is particularly preferable to use Mo and W from a viewpoint that a large chemical change is obtained by the ultraviolet rays or the visible light.

As incomplete oxides of the transition metal, besides the incomplete oxide of the transition metal of one kind, all of an incomplete oxide added with the second transition metal, an incomplete oxide further added with a plurality of kinds of transition metals, an incomplete oxide added with an element other than the transition metal, and the like are incorporated in the scope of the embodiment. Particularly, an incomplete oxide containing a plurality of kinds of metal elements is preferable. Besides the incomplete oxide of the transition metal of one kind, in the cases of the incomplete oxide added with the second transition metal and the incomplete oxide further added with three or more of kinds of transition metals, it is considered that a part of the transition metal atoms of one kind having a crystalline structure have been replaced by other transition metal atoms. However, whether or not the oxide is the incomplete oxide is discriminated by checking whether or not the oxygen content lacks more than that of the stoichiometric compositions which those plurality of kinds of transition metals can have.

As an element other than the transition metal, at least one kind of Al, C, B, Si, Ge, and the like can be used. By using a combination of two or more kinds of transition metals or by adding the element other than the transition metal, a crystal grain of the incomplete oxide of the transition metal decreases. Therefore, the boundary portion between the exposing portion and the non-exposing portion becomes further clear and the resolution is further raised. Exposing sensitivity can be improved.

The foregoing resist material may be manufactured by a sputtering method in an $(Ar+O_2)$ atmosphere using a target containing a predetermined transition metal. For example, a ratio of $O_2$ to the whole flow amount of introducing gases into a chamber is set to 5 to 20% and a gas pressure is set to a gas pressure (1 to 10 Pa) in the ordinary sputtering.

In the embodiment, the resist layer is formed as follows. First, a film of the resist layer made of the incomplete oxide of the transition metal is formed on the substrate whose surface has sufficiently been smoothed. As a specific film forming method, for example, a method of forming the film by the sputtering method in the argon and oxygen atmosphere by using a sputtering target made of a simple substance of the transition metal can be mentioned. In this case, the oxidization degree of the incomplete oxide of the transition metal can be controlled by changing concentration of an oxygen gas in a vacuum atmosphere. In the case of forming the film of the incomplete oxide of the transition metal containing two or more kinds of transition metals by the sputtering method, a plurality of kinds of transition metals are mixed by always rotating the substrate over different kinds of sputtering targets. A mixture ratio is controlled by changing a sputtering applying power of each target.

Besides the sputtering method in the oxygen atmosphere using the metal targets mentioned above, by preliminarily executing the sputtering in the normal argon atmosphere by using the target made of the incomplete oxide of the transition metal containing a desired amount of oxygen, a film of the resist layer made of the incomplete L oxide of the transition metal can be also similarly formed.

Further, besides the sputtering method, a film of the resist layer made of the incomplete oxide of the transition metal can be also easily formed by an evaporation depositing method.

As a material of the substrate, silicon, glass, plastics such as polycarbonate or the like, alumina titanium carbide, nickel, or the like can be used.

A film thickness of resist layer can be arbitrarily set. For example, it may be set to a thickness within a range from 10 to 80 nm.

The resist layer formed on the substrate is exposed by an optical recording apparatus. The optical recording apparatus used in the embodiment will now be described with reference to FIG. 1. A resist layer 11 obtained by forming the inorganic resist film onto a master 10 made of silicon or the like as mentioned above is exposed, so that a latent image of pits is formed on the resist layer 11.

When the latent image is formed on the resist layer 11, the master 10 is attached onto a turntable 12 provided on a mobile optical table 20. When the resist layer 11 is exposed, the master 10 is rotated by the turntable 12 and the master 10 is moved in parallel by the mobile optical table 20 so that the exposure of desired patterns is executed on the whole surface of the resist layer 11. The master 10 is rotated, for example, at a constant linear velocity.

In such a laser cutting apparatus, the resist layer 11 on the master 10 is exposed so that tracks of a desired track pitch, for example, 160 nm are formed. A rotational speed of the turntable 12 is controlled by a spindle servo 13 so that a linear velocity in the longitudinal direction of the tracks is equal to, for example, 2.00 [m/sec]. A feed pitch of the mobile optical table 20 is controlled by controlling the operation of an air slider 32 by a high-precision track feeding servo 33. The feeding servo 33 makes positioning control by using a laser scale 31 having a wavelength of, for example, 0.78 [µm] and resolution of, for example, 0.28 nm as a reference. By such control, a latent image of a groove pattern in a data recording area can be formed onto the resist layer 11 on the master 10 at the track pitch of 160 nm.

The slide motor is driven by the linear amplifier of a wide band up to about tens of kHz by using the laser scale 31 having the super-high resolution (0.28 nm) and the operation of the air slider 32 is controlled by the slide motor at a high gain. Thus, a latent image of a pit pattern in which a track pitch variation is equal to or less than ±3 nm can be formed on the resist layer 11.

A laser beam for recording is emitted from a laser light source 14. An arbitrary light source can be used as a light source 14. It is preferable to use a light source which emits a laser beam of a short wavelength, for example, a deep ultraviolet laser such as so-called "DeepUV" whose wavelength is equal to a value in the 200-nm range. Specifically speaking, for example, a laser source which oscillates the recording laser beam of quartic harmonics ($\lambda$=266 nm) of a YAG laser is used.

The laser beam emitted from the light source 14 goes straight as a parallel beam, enters a laser intensity modulator such as an EOM (Electro Optic Modulator) 15 as a modulator using an electro-optical effect, and its intensity is modulated by the EOM 15. The laser beam whose intensity has been modulated by the EOM 15 enters a beam splitter BS1 for separating the optical path through an analyzer. A part of the laser beam transmitted through the beam splitter BS1 enters a photodetector (PD) 16 arranged on the transmission optical path.

A detection signal of the photodetector 16 is supplied to an APC (Auto Power Controller) 17. Feedback control is made to the EOM 15 by the APC 17. A light output power of the laser beam transmitted through the EOM 15 is changed by the APC 17 in correspondence to the linear velocity and the recording can be executed while an exposure amount per unit area is held constant. For example, a change amount of the exposure amount can be suppressed within ±1.0 W.

The laser beam reflected by the beam splitter BS1 is guided to a modulation optical system OM. Two lenses 21 and 23 and one AOM (Acoustic Optical Modulator) 22 are arranged for the modulation optical system OM. The lenses 21 and 23 and the AOM 22 are arranged so that the laser beam which has entered as a parallel beam and a lattice plane satisfy a Bragg condition. A synthetic quartz is suitable as an acoustic optical element which is used for the AOM 22.

A predetermined signal is supplied to the ACM 22 from a driving circuit 24. This signal is, for example, a 1-7 modulated pulse signal. For example, in the "Blu-ray Disc (registered trademark of Sony Corporation)" format, a system called "1-7PP (Parity Preserve/Prohibit) RMTR" is used as an encoding system. This encoding system is a system in which one or more number of "0" are included between "1" and "1" and two bits are replaced by three bits. As will be explained hereinafter, in the case of forming a pit of a length of nT (n is a positive integer), the above predetermined signal is (n−1) pulse signals, and each pulse has a large amplitude at the head and has a small amplitude in the rear portion.

The AOM 22 uses a principle in which an intensity of a primary diffracted light in Bragg diffraction is almost proportional to an ultrasonic power. The AOM 22 modulates the ultrasonic power on the basis of the modulation signal and the intensity of the laser beam is light-modulated.

To realize the Bragg diffraction, a positional relation and a position of the AOM 22 to an optical axis of the laser beam are set so as to satisfy the following Bragg condition.

$$2d \sin \theta = n\lambda$$

where,
d: lattice interval
λ: wavelength of the laser beam
θ: angle between the laser beam and the lattice plane
n: integer The modulation light outputted from the modulation optical system OM is reflected by a mirror M2, horizontally guided over the mobile optical table 20, and enters a beam expander (BEX) 26. The laser beam whose beam diameter has been increased by the beam expander 26 is reflected by a mirror M3 and irradiated onto the resist layer 11 on the master 10 through an objective lens 27. By increasing the beam diameter, a numerical aperture NA of the objective lens 27 can be set to 0.9. The latent image of the pits is formed in the data recording area of the track on the resist layer 11.

Subsequently, a developing process is executed to the resist layer 11 on the master 10. For example, the resist layer 11 coated on the master 10 is a positive type resist and a portion where the latent image has been formed by the resist light is melted by the development. For example, this portion corresponds to the pit and the portion remaining after the development corresponds to the land. In more detail, the non-developed master 10 is put onto the turntable of a developing apparatus (not shown). While the master 10 is rotated together with the turntable 12, a developer is dropped onto the surface of the master 10 and the resist layer 11 on this surface is developed. Thus, the resist master 10 on which the pits have been patterned can be obtained.

Subsequently, an electroconductive film layer as a nickel coating film is formed onto the concave/convex patterns of the optical disk master by an electroless plating method or the like. The optical disk master formed with the electroconductive film layer is attached to an electroforming apparatus. A nickel plating layer is formed onto the electroconductive film layer by an electroplating method so as to have a thickness of about 300±5 [μm]. Subsequently, the nickel plating layer is peeled off from the master with the nickel plating layer by using a cutter or the like. The resist on the signal forming surface of the nickel plating layer is cleaned by using acetone or the like, thereby forming a stamper. For example, a master stamper is formed from the master 10 and a mother stamper whose concave/convex patterns are reversed, that is, are opposite to those of the master stamper is further formed.

The mother stamper is attached to a die of an injection molding apparatus and a resin such as polycarbonate (refractive index; 1.59) or the like is injected into a cavity, so that a disc substrate to which the concave/convex patterns of the stamper have been transferred is formed. At this time, the resin which is used for the disc substrate has been plasticized by the heat so that it can be filled into the die at a high speed. The injection molded disc substrate having a thickness of 1.1 mm is cooled to 30° C. or lower. After that, a thin metal film of aluminum alloy, silver, or the like is formed on the pit surface side by using a sputtering apparatus, so that a reflecting film is formed.

Subsequently, an ultraviolet hardening resin is dropped as an adhesive agent onto the disc substrate on which the reflecting layer film has been formed and the disc substrate is uniformly coated with the resin by a spin coating method. After that, the coating surface of the ultraviolet hardening resin on the disc substrate and the polycarbonate film are held at the opposite positions and subsequently adhered. The adhering process of the polycarbonate film is executed in the vacuum. This is because it is necessary to prevent that wrinkles and gaps occur in the adhering surface of the disc substrate and the polycarbonate film and a reading error occurs.

Subsequently, by irradiating ultraviolet rays onto the disc to which the polycarbonate film has been adhered, the ultraviolet hardening resin is hardened, thereby adhering the disc substrate and the polycarbonate film. Further, a hard coating agent of an ultraviolet hardening type is dropped onto the polycarbonate film adhered to the disc and the polycarbonate film is uniformly coated with the coating agent by the spin coating method. After that, the hard coating agent is hardened by irradiating the ultraviolet rays again, thereby forming a hard coating layer. Thus, the disc is completed. A disc for evaluating is also similarly formed.

In the encoding system called "1-7PP (Parity Preserve/Prohibit) RMTR" as mentioned above, pits of eight kinds of lengths of (2T, 3T, 4T, 5T, 6T, 7T, 8T) and 9T existing in a part of the recording area as pit lengths are formed. The signal in a recording signal portion becomes almost random signal patterns of 2T to 9T. A single signal pattern of a relatively small pit such as 2T, 3T, or the like is formed in a dedicated monitor signal portion.

Figure 2A:
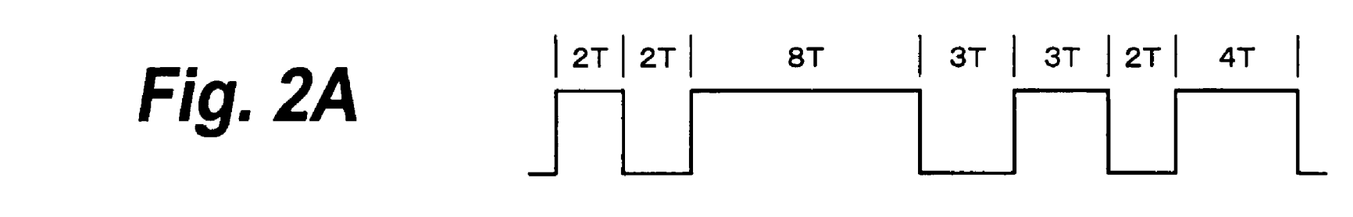
FIGS. 2A to 2E are schematic diagrams for explaining a pulse strategy in the embodiment of the invention.

In the laser exposing apparatus in the related art, the intensity of the laser beam has been modulated by a pulse waveform of a 1-7 modulation signal shown in FIG. 2A by using the AOM. FIG. 2A shows the pulse waveform in which (a 2T mark, a 2T space, an 8T mark, a 3T space, a 3T mark, a 2T space, and a 4T mark) continue.

Figure 2B:
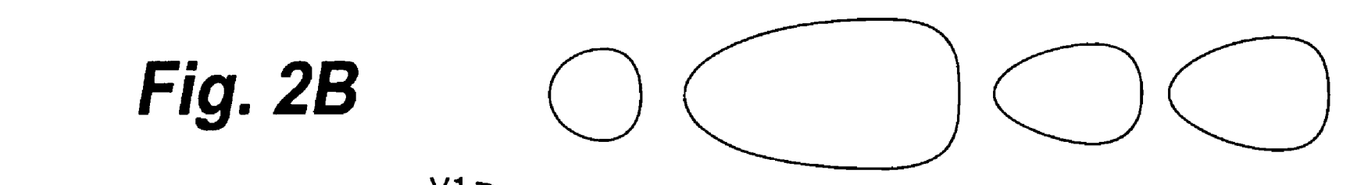

Even if the laser beam for exposing is directly modulated by the 1-7 modulation signal as mentioned above, as shown in FIG. 2B, in the formed evaluating disc, there are such problems that the pit width is changed due to the pit length, the heat is accumulated in the rear portion of the exposure beam, a change in width in one pit occurs, and a fluctuation in pit width depending on the pit length occurs. The invention can be also applied to encoding systems other than the 1-7 modulation.

An embodiment of the invention intends to solve such a problem. In an embodiment of the invention, it is assumed that the laser beam for exposing is not continuously set to the high level for a period of time corresponding to the width of mark but is set to the pulse signals of a predetermined period and the level of the pulse signals is set to be larger as the pulse approaches the head pulse. A setting method of the number of pulse signal B for modulating and their levels is called "pulse strategy". Assuming that a mark length is equal to nT, the number of pulses is equal to (n−1). In the example shown in FIGS. 2A to 2E, the numbers of pulses corresponding to the marks of 2T, 8T, 3T, and 4T are set to 1, 7, 2, and 3, respectively. In this instance, three kinds of pulse strategies A, B, and C are set and evaluation is made with respect to each pulse strategy.

Figure 2C:
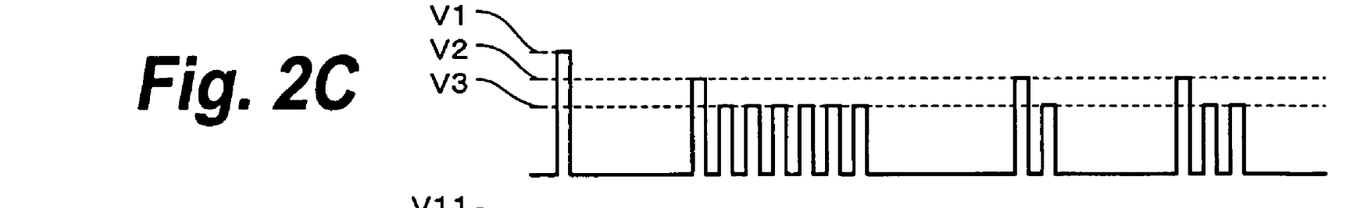
Figure 6:
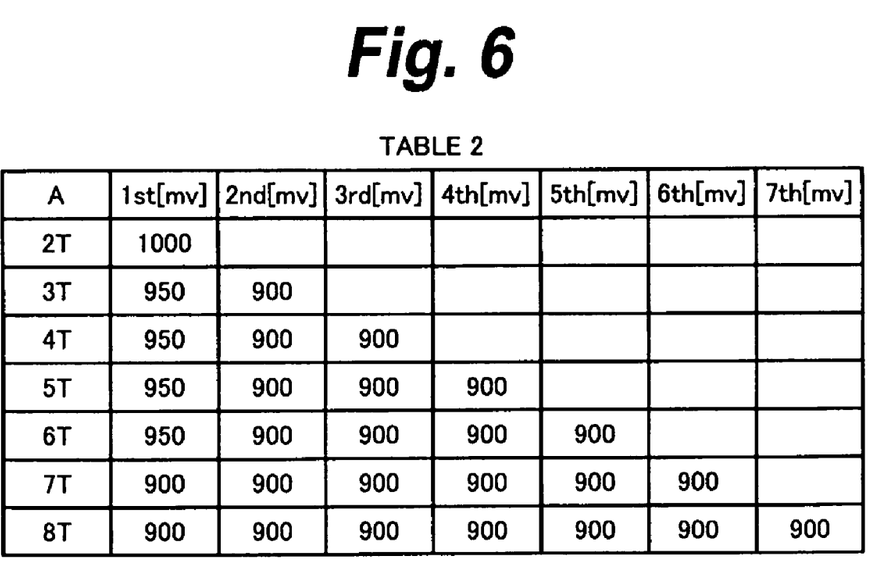
FIG. 6 is Table 2 showing a voltage setting of a pulse strategy A.

As shown in FIG. 2C, three kinds of levels of V1, V2, and V3 (V1>V2>V3) exist as levels of the pulses. The method whereby the maximum level V1 is used only for the mark of 2T corresponds to the pulse strategies A and B. A voltage setting of the pulse strategy A is shown in Table 2 of FIG. 6. In the pulse strategy A, V1=1000 mV, V2=950 mV, and V3=900 mV. In the case of forming the pits corresponding to the marks of 3T to 6T (referred to 3T pit to 6T pit), the level of the head pulse is set to V2 and the levels of the remaining (n−2) pulses are set to V3. In the case of forming the pits corresponding to the marks of 7T and 8T (referred to 7T pit and 8T pit), the levels of the pulses are equally set to V2.

Figure 7:
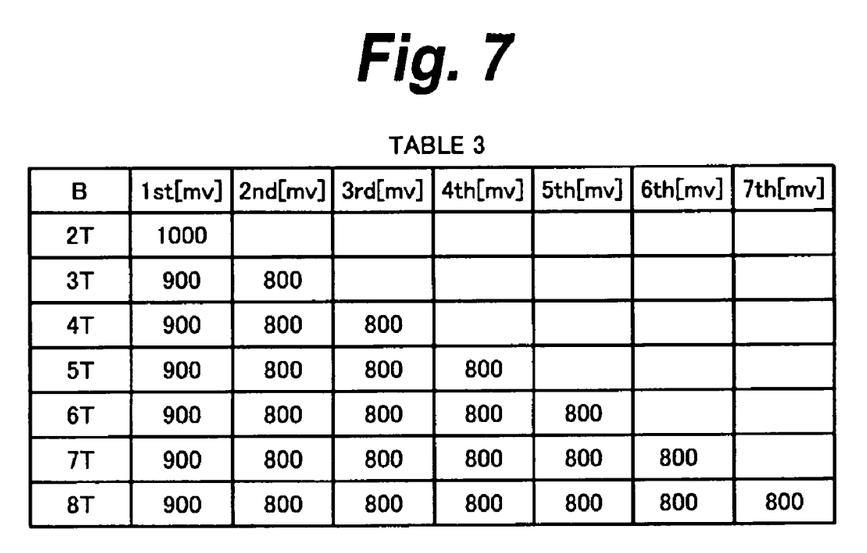
FIG. 7 is Table 3 showing a voltage setting of a pulse strategy B.

A voltage setting of the pulse strategy B is shown in Table 3 of FIG. 7. In the pulse strategy B, V1=1000 mV, V2=900 mV, and V3=800 mV. In the case of forming the 3T to 8T pits, the level of the head pulse is set to V2 and the levels of the remaining (n−2) pulses are set to V3.

Figure 2D:
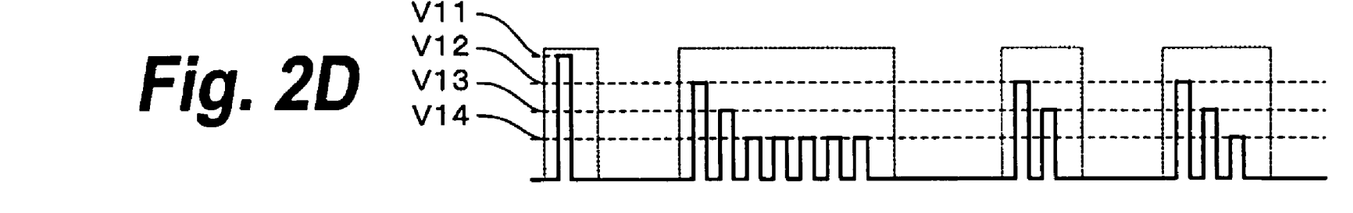
Figure 8:
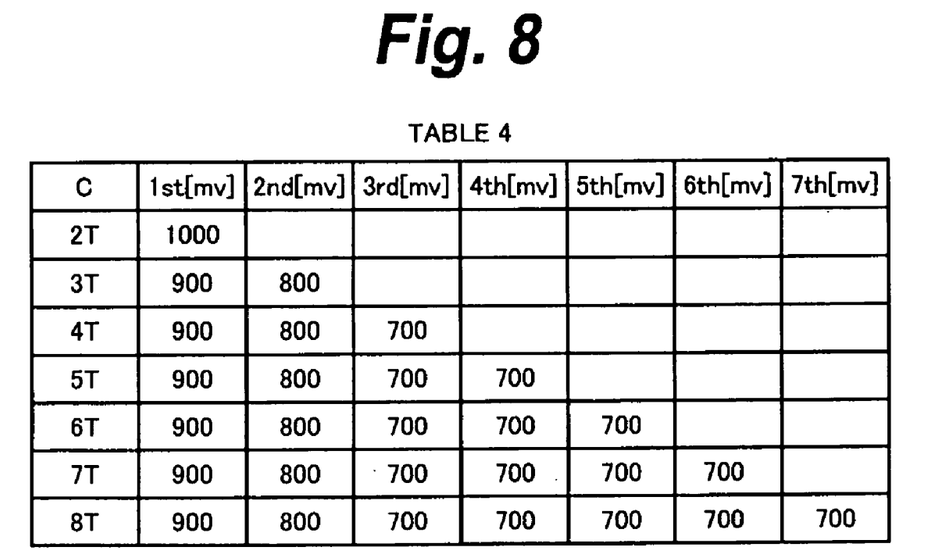
FIG. 8 is Table 4 showing a voltage setting of a pulse strategy C.

As shown in FIG. 2D, four kinds of levels of V11, V12, V13, and V14 (V11>V12>V13>V14) exist as levels of the pulses. The method whereby the maximum level V11 is used only to form the 2T pit corresponds to the pulse strategy C. A voltage setting of the pulse strategy C is shown in Table 4 of FIG. 8. In the pulse strategy C, V11=1000 mV, V12=900 mV, V13=800 mV, and V14=700 mV. In the case of forming the 3T to 8T pits, the level of the head pulse is set to V12, the level of the second pulse is set to V13, and the levels of the remaining (n−3) pulses are set to V14.

Figure 2E:
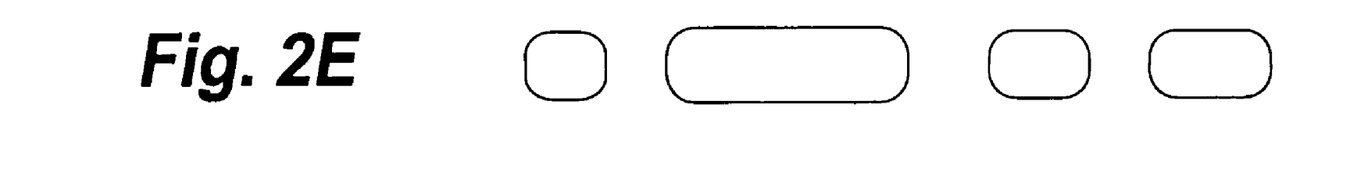

As will be explained hereinafter, by using the pulse strategies B and C, as shown in FIG. 2E, the pit in which the fluctuation of the pit width is small can be formed without causing such problems that the pit width is changed due to the pit length, the heat is accumulated in the rear portion of the exposure beam, the change in width in one pit occurs, the fluctuation in pit width depending on the pit length occurs, and the like.

Figure 9:
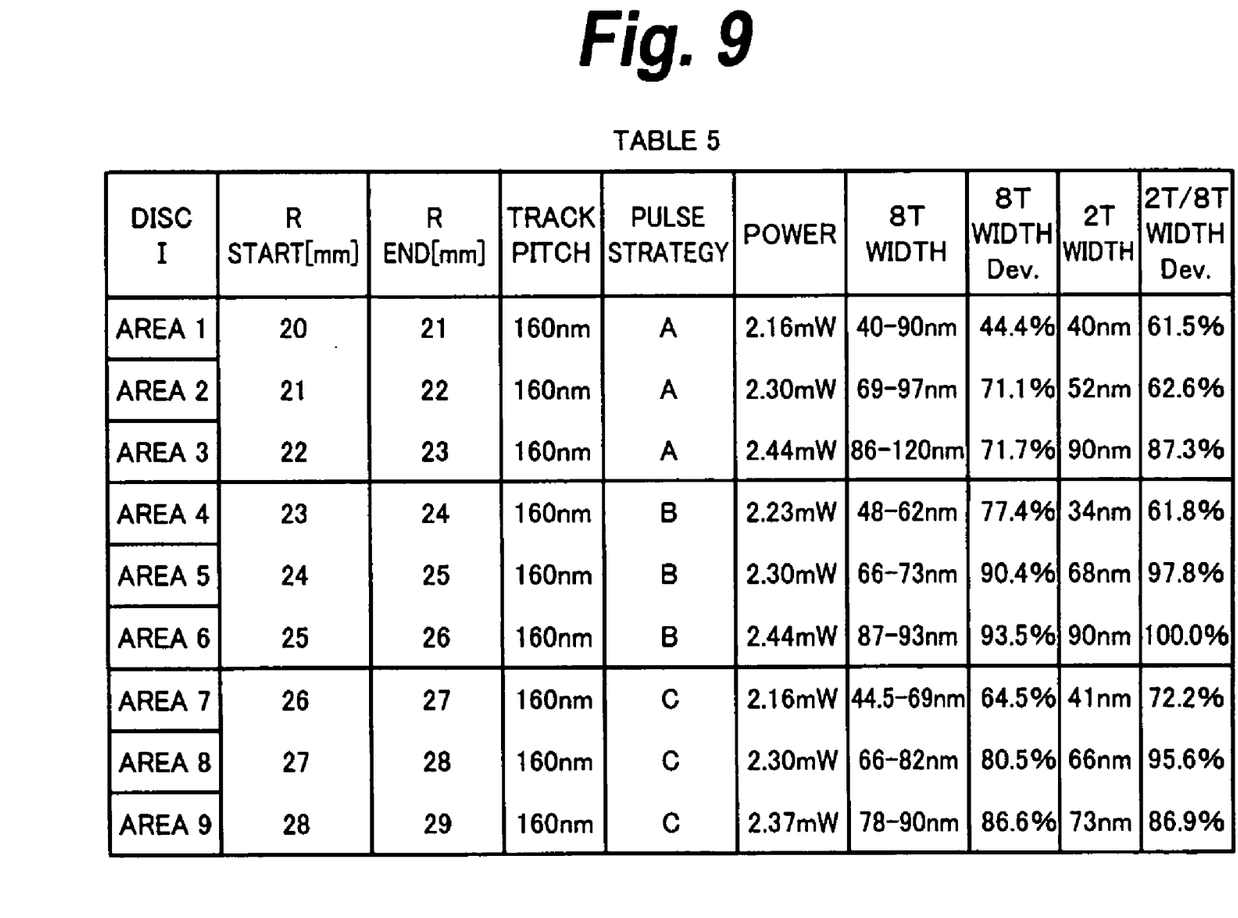
FIG. 9 is Table 5 showing measurement results of pit shapes regarding an evaluating disc I.

An evaluating disc I is formed by using each of the foregoing pulse strategies A, B, and C and evaluation is made by using an evaluating apparatus (reproducing apparatus) having a hyper-hemispherical ball lens optical pickup (wavelength 405 nm, NA=2.1). In the evaluating disc I, a track pitch is equal to 160 nm and a length of 2T on the disc is equal to 75 nm. Nine areas on the disc are set. The pulse strategy A, pulse strategy B, and pulse strategy C are applied to the regions each of which is formed by three areas in order from the inner rim side, respectively. Areas 1 to 9 are obtained by dividing a range from 20 mm to 28 mm as a radius of the disc on a unit basis of 1 mm. With respect to each pulse strategy, an emitting power of the laser beam is changed to three kinds of powers (2.16 mW, 2.30 mW, 2.44 mW). With respect to the evaluating disc I, measurement results of the pit shapes are shown in Table 5 of FIG. 9.

Figure 3A:
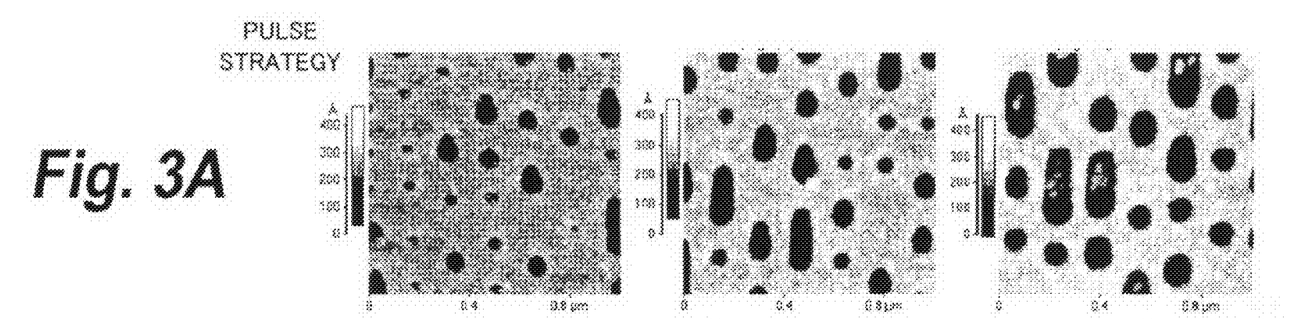
FIGS. 3A to 3C are brightness diagrams of an AFM showing pit shapes in different formats.
Figure 3B:
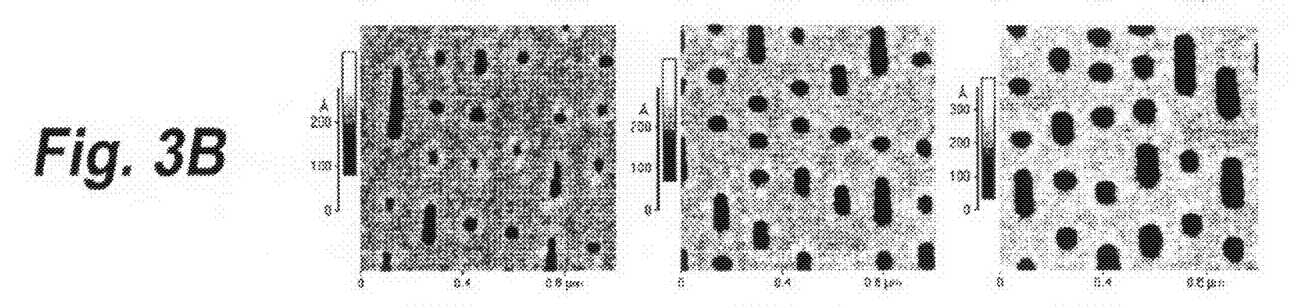
Figure 3C:
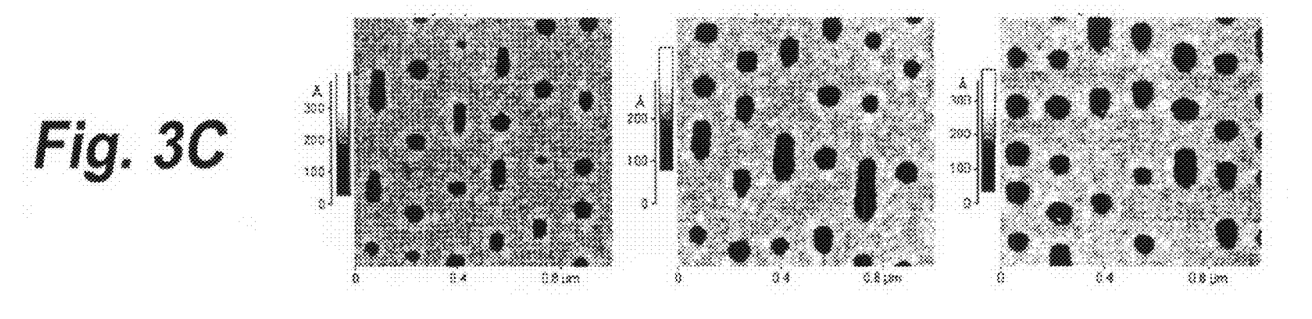

FIGS. 3A to 3C show brightness diagrams of an AFM (Atomic Force Microscope) of the pit shapes of the evaluating disc I. In FIGS. 3A to 3C, the brightness diagrams of the areas 1, 2, and 3 using the pulse strategy A are the three diagrams shown at the upper stage. The brightness diagrams of the areas 4, 5, and 6 using the pulse strategy B are the three diagrams shown at the middle stage. The brightness diagrams of the areas 7, 8, and 9 using the pulse strategy C are the three diagrams shown at the lower stage. The brightness corresponds to a depth of pit. In FIGS. 3A to 3C, the pit is shown as a dark portion, that is, a concave portion. In the formed evaluating disc, the pit is a convex portion. However, since FIGS. 3A to 3C are diagrams showing the state at the stage of the stamper, the concave/convex portions are shown in a reversed state.

The 8T width as one of evaluating items indicates the minimum value and the maximum value of the width of pit in the case of forming the 8T pit. The 8T width fluctuation (that is, deviation) indicates a range of the fluctuation of the 8T width obtained by dividing the minimum value by the maximum value. It means that the more the 8T fluctuation is close to 100%, the smaller the width fluctuation is. The 2T width indicates a width of pit in the case of forming the 2T pit. The (2T/8T) width fluctuation indicates a ratio between the average value of the 2T width and that of the 8T width. It means that the more the (2T/8T) width fluctuation is close to loot, the smaller the width fluctuation is in the case where the pits of different lengths have been formed. In the case where the 8T pit is formed, the fluctuation of the pit width is largest as compared with those in the case of forming the pits of other lengths. Therefore, the 8T mark is used as an item of the evaluation.

As shown in Table 5 mentioned above, in the pulse strategy A, the width fluctuation of the 8T pit is larger and the ratio of the (2T/8T) width fluctuation is smaller than those in the other pulse strategies B and C. In all of the pulse strategies, if the power of the laser beam is insufficient, the fluctuation of the pit width increases. However, the power of the laser beam can be properly set. Further, it will be also understood from the brightness diagrams of the AFM of FIGS. 3A to 3C that the fluctuation of the pit width is large in the pulse strategy A.

In the evaluating disc I, the stable tracking servo and the stable pit reproduction can be performed, in the areas 5, 6, 8, and 9, in other words, the reproduction in which the error rate is sufficiently small can be performed. In those areas, since the fluctuation of the pit width due to the pit length is small and the fluctuation of the width in one pit is also small, the stable reproduction can be performed.

Another evaluating disc II is formed. In the evaluating disc II, a track pitch is changed to 300 nm, 200 nm, and 120 nm and a length of 2T pit is changed to 141 nm, 94 nm, and 56 nm by using the pulse strategies B and C, respectively. The areas 1 to 9 are obtained by dividing the range from 20 mm to 28 mm as a radius of the disc on a unit basis of 1 mm. Different parameters are used in the areas 1 to 9. With respect to the evaluating disc II, measurement results of the pit shapes are shown in Table 6 of FIG. 10.

Figure 10:
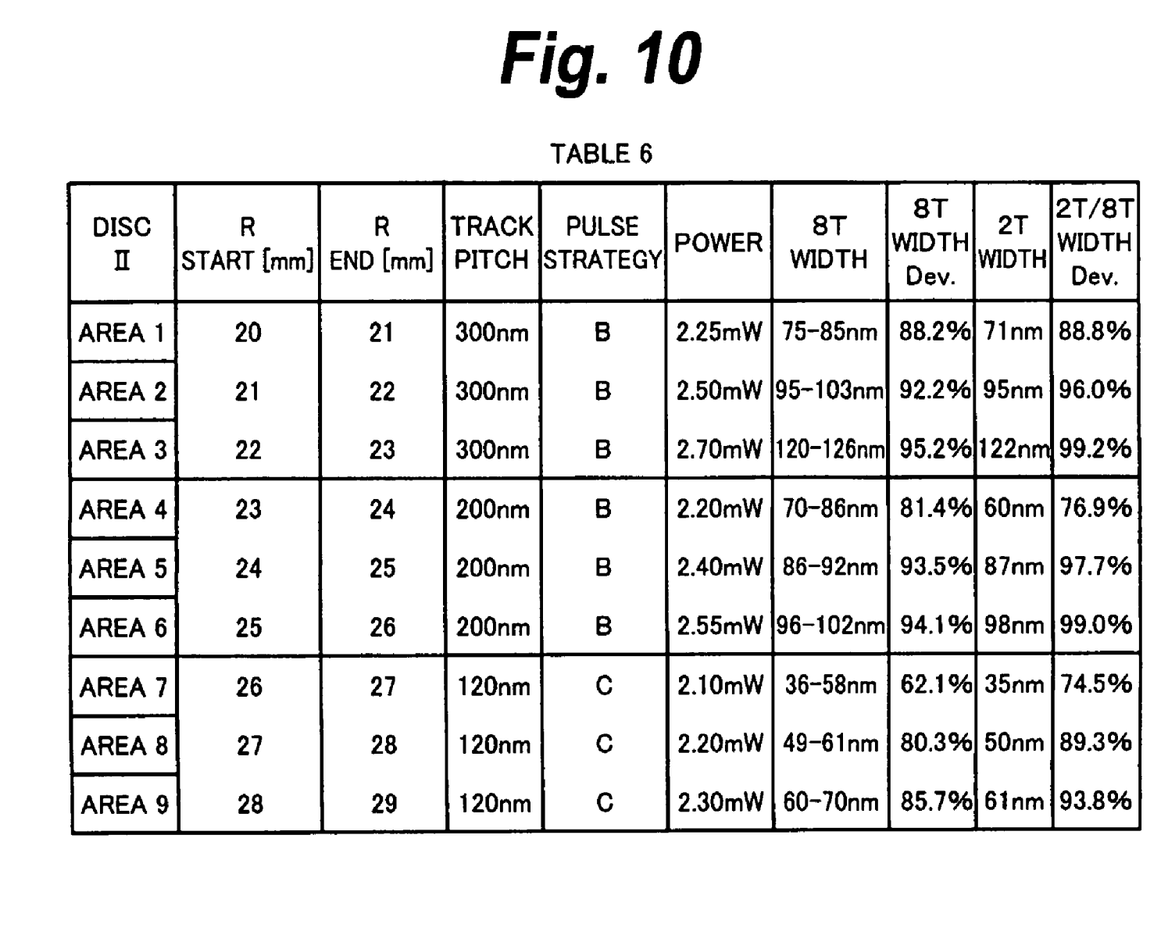
FIG. 10 is Table 6 showing measurement results of pit shapes regarding an evaluating disc II.

It will be understood from the measurement results of Table 6 that the stable tracking servo can be performed and the pit can be stably reproduced in the areas 2, 3, 5, 6, 8, and 9.

With respect to the evaluating discs I and II mentioned above, conditions in which the stable tracking servo can be performed and the pit can be stably reproduced are as follows.

(1) The width fluctuation of one pit (for example, 8T pit) (8T width fluctuation) is equal to or less than 80.3

(2) The fluctuation of the pit width due to the pit length is equal to or less than 89.3 W.

Further, when an attention is paid to the high-precision format in which the track pitch variation is equal to or less than ±3 nm, in the formats of the areas 2, 3, 5, 6, 8, and 9 (track pitch is equal to 300 to 120 nm), it is necessary that (the track pitch variation)/(the track pitch) is equal to or less than ±0.03 nm.

As mentioned above, in the embodiment of the invention, there are used: the laser light source 14 having the wavelength of 266 nm; the objective lens 27 having the numerical aperture NA=0.9; the high-precision light output control in which the change amount of the exposure amount is equal to or less than ±1.0%; the proper pulse strategies B and C; and the high-precision track feeding servo whose track pitch variation is equal to or less than ±3 nm. Therefore, the ROM type optical disk format whose track pitch is equal to or less than 300 nm can be realized.

The laser having the wavelength of 266 nm is converged by the objective lens having the NA of 0.90 and the format of the track pitch (300 nm to 120 nm) which is extremely smaller than the exposure beam diameter (360 nm) can be realized.

(The track pitch)/(the exposure beam diameter) =0.333 to 0.833

Although the embodiment of the invention has specifically been described above, the invention is not limited to the foregoing embodiment but various modifications based on the technical idea of the invention are possible. For example, the numerical values mentioned in the above embodiment are merely shown as an example and other different numerical values may be used as necessary. The cutting apparatus may have any construction other than that shown in FIG. 1. Further, the optical recording medium is not limited to the disc shape but may have a card shape.

It should be understood by those skilled in the art that various modifications, combinations, sub-combinations and alterations may occur depending on design requirements and other factors insofar as they are within the scope of the appended claims or the equivalents thereof.

What is claimed is:

1. A master for an optical disk having a format in which a track pitch is equal to 300 to 120 nm, wherein
a width change of a pit having a maximum length among a plurality of pit lengths is equal to or less than 80.3%.

2. A master for an optical disk having a format in which a track pitch is equal to 300 to 120 nm, wherein
a fluctuation of a pit width due to a pit length is equal to or less than 89.3%.

3. An optical recording medium having a format in which a track pitch is equal to 300 to 120 nm, wherein
a width change of a pit having a maximum length among a plurality of pit lengths is equal to or less than 80.3%.

4. An optical recording medium having a format in which a track pitch is equal to 300 to 120 nm, wherein
a fluctuation of a pit width due to a pit length is equal to or less than 89.3%.

* * * * *